Feb. 25, 1936.　　　R. S. KELLEY　　　2,031,959
FASTENER
Filed July 10, 1933
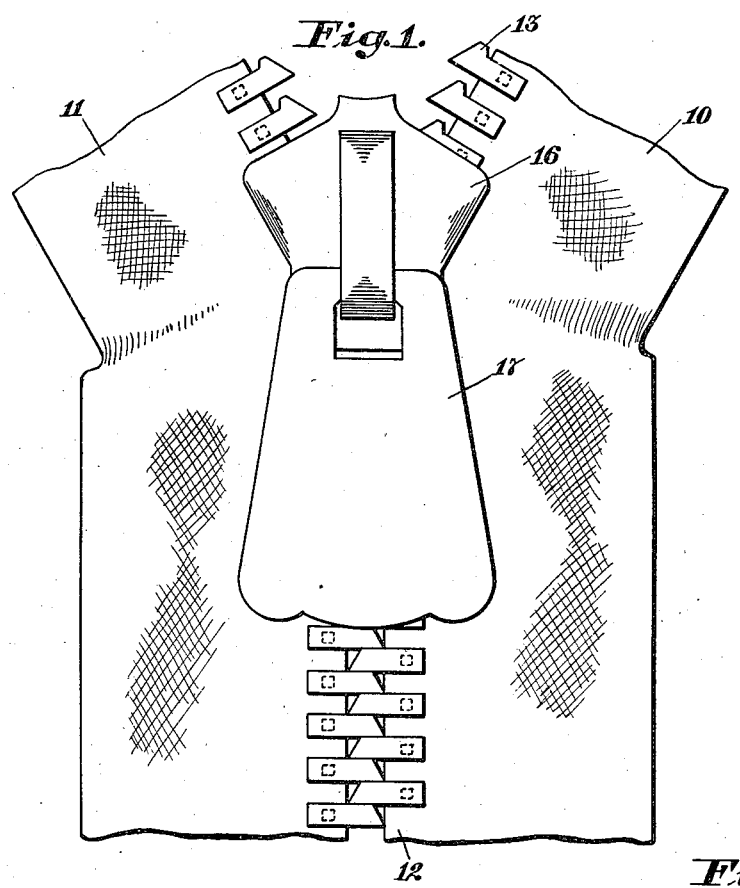
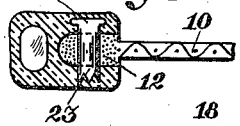
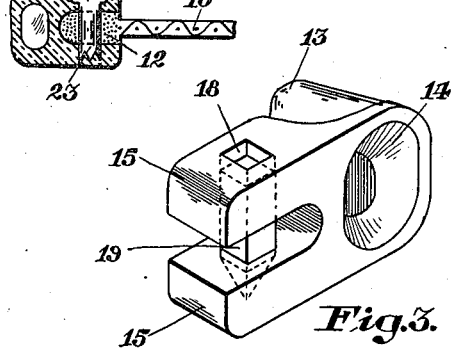
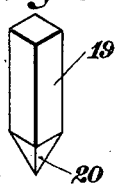
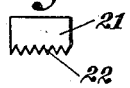
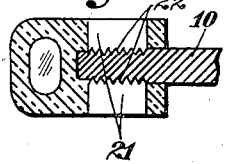
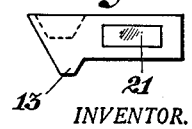
INVENTOR.
Roland S. Kelley
BY Kelley & Chisholm
ATTORNEYS.

Patented Feb. 25, 1936

2,031,959

UNITED STATES PATENT OFFICE 2,031,959

FASTENER

Roland S. Kelley, Meadville, Pa., assignor to Hookless Fastener Company, a corporation of Pennsylvania Application July 10, 1933, Serial No. 679,689

4 Claims. (Cl. 24—205)

My invention relates to separable interlocking fasteners and particularly to the attachment of the individual fastener members to the edges of flexible supports.

My invention aims particularly to provide means for anchoring individual fastener members in large numbers at small expense on the edges of flexible tapes without substantial distortion of the said fastener members during attachment.

The fastener members may be shaped from a suitable non-metallic material of the plastic class. A cellulosic product such as pyralin is particularly suitable for this type of fastener although the fastener members may be molded individually from phenolic condensation products such as bakelite. The fastener members, however, can not be attached to the tapes in the same way as metallic members for the reason that the clamping portions can not be bent after they are completely formed except by the application of heat which introduces many complications and is difficult to control.

My invention specifically provides anchor or coupling members mounted in recesses in the fastener members and either piercing or engaged in some manner with the tape so as to hold the fastener members against movement along the edges of the tape. In the accompanying drawing I have shown for purposes of illustration, three specific embodiments of my invention. In the drawing:

Fig. 1 represents a general view of the fastener constructed according to my invention;

Fig. 2 is a cross-section through the fastener;

Fig. 3 is a perspective view of an individual fastener member;

Fig. 4 shows a coupling pin;

Figs. 5, 6 and 7 illustrate a modification; and

Fig. 8 shows a still further modification.

The fastener illustrated comprises a pair of flexible supports herein fabric tapes 10, 11, having, if desired, beaded edges 12. The fastening members herein shown conform in general to the shape of the fastening members in certain well-known slide fasteners. Each member has interlocking means in the form of a projection 13 and recess 14, and attaching means in the form of parallel arms 15. The fastener members are brought into interlocking relation by means of a slider 16 which is actuated by a pull tab 17.

The arms 15 are formed with recesses herein designated 18, to receive a coupling pin or anchor member 19. In Figs. 2, 3 and 4 this member may be formed as a simple pin of the same material as the fastener member and having a pointed end 20, which will readily pierce the tape. The pin may have a wedge fit or after it is inserted it may be stuck in place by means of solvent or cement. In the modified form shown in Figs. 5, 6 and 7 the anchor members 21 have serrated surfaces 22 which engage in the tape. These members may be formed of the same non-metallic material as the fastener member or they may have a sheet metal serrated bottom anchored to non-metallic heads. In Fig. 8 there is illustrated a rivet 23 having a non-metallic head 24 which may be used in the place of the pin 19.

While I have shown and described in this application three embodiments which my invention may assume in practice, it will be understood that these embodiments are only for the purposes of illustration and description and that various other forms may be devised within the scope of my invention as defined in the appended claims.

What I claim as my invention is:

1. In a separable interlocking fastener the combination of a flexible support, a series of bifurcated non-metallic fastener elements mounted astride one edge of the support, at least one of the bifurcations of each element having a recess therein, and non-metallic retaining means disposed in each of said recesses and having a roughened surface in engagement with the surfaces of said support, said retaining means being cemented to the fastener elements.

2. In a separable interlocking fastener the combination of a flexible support, a series of bifurcated non-metallic fastener elements mounted astride one edge of the support, each of the bifurcations having a hole therethrough, and a non-metallic retaining member for each element, said retaining member passing thru the tape and disposed in the holes and being cemented to the fastener elements.

3. In a separable interlocking fastener the combination of a flexible support, a series of bifurcated non-metallic fastener elements disposed astride one edge of the support, each of the bifurcations having a recess therein, and non-metallic retaining means in each of said recesses in locking relation with said tape, said retaining means beng cemented to the fastener elements.

4. In a separable interlocking fastener the combination of a flexible support, a series of bifurcated non-metallic fastener elements disposed astride one edge of the support, at least one of the bifurcations of each element having a recess therein, and a non-metallic anchoring member disposed in said recess, said anchoring member having a roughened face held in locking relation with the support, the anchoring member being cemented to the walls of said recess.

ROLAND S. KELLEY.